(12) United States Patent
Filice et al.

(10) Patent No.: US 8,234,166 B2
(45) Date of Patent: Jul. 31, 2012

(54) AUTOMATED USER SEGMENT SELECTION FOR DELIVERY OF ONLINE ADVERTISEMENTS

(75) Inventors: Robert G. Filice, San Jose, CA (US); David E. Zinman, Burlingame, CA (US)

(73) Assignee: Yahoo! Inc., Sunnyvale, CA (US)

( * ) Notice: Subject to any disclaimer, the term of this patent is extended or adjusted under 35 U.S.C. 154(b) by 309 days.

(21) Appl. No.: 12/260,601

(22) Filed: Oct. 29, 2008

(65) Prior Publication Data

US 2010/0106606 A1 Apr. 29, 2010

(51) Int. Cl.
*G06Q 30/00* (2006.01)
(52) U.S. Cl. ............... 705/14.6; 705/14.66; 705/14.49; 705/14.73
(58) Field of Classification Search .............. 705/14.6, 705/14.66, 14.49, 14.73
See application file for complete search history.

(56) References Cited

U.S. PATENT DOCUMENTS

| | | | |
|---|---|---|---|
| 5,948,061 A * | 9/1999 | Merriman et al. ............ 705/14 |
| 6,285,985 B1 | 9/2001 | Horstmann |
| 6,757,661 B1 | 6/2004 | Blaser et al. |
| 6,804,659 B1 | 10/2004 | Graham et al. |
| 6,839,680 B1 | 1/2005 | Liu et al. |
| 6,847,969 B1 | 1/2005 | Mathai et al. |
| 7,089,194 B1 | 8/2006 | Berstis et al. |
| 7,089,195 B2 | 8/2006 | Rosenberg |
| 7,181,415 B2 | 2/2007 | Blaser et al. |
| 7,313,622 B2 | 12/2007 | Lee et al. |
| 7,346,606 B2 | 3/2008 | Bharat |
| 7,376,714 B1 * | 5/2008 | Gerken ............ 709/219 |
| 7,406,434 B1 | 7/2008 | Chang et al. |
| 7,415,423 B2 | 8/2008 | Ranka et al. |
| 2004/0103024 A1 | 5/2004 | Patel et al. |
| 2004/0148222 A1 | 7/2004 | Sabella et al. |
| 2004/0186776 A1 | 9/2004 | Llach |
| 2004/0225562 A1 | 11/2004 | Turner |
| 2005/0027594 A1 | 2/2005 | Yasnovsky et al. |
| 2005/0165643 A1 * | 7/2005 | Wilson et al. ........... 705/14 |
| 2006/0212350 A1 | 9/2006 | Ellis et al. |
| 2007/0055569 A1 | 3/2007 | Subramanian et al. |
| 2008/0004956 A1 | 1/2008 | Atherton et al. |
| 2008/0215416 A1 | 9/2008 | Ismalon |
| 2008/0294524 A1 * | 11/2008 | Badros et al. ........... 705/14 |

FOREIGN PATENT DOCUMENTS

| | | | |
|---|---|---|---|
| WO | WO-2007139105 A1 | 12/2007 |
| WO | WO-2008064569 A1 | 6/2008 |
| WO | WO-2008075886 A1 | 6/2008 |

OTHER PUBLICATIONS

Isham, Bryce "Market Segmentation Analysis Applied to the Online World", *Online Advertising Discussion List*; http://www.o-a.com/archive/9912/0487.html, (Dec. 2, 1999), 2 pages.

(Continued)

*Primary Examiner* — Michael Bekerman
(74) *Attorney, Agent, or Firm* — Fiala & Weaver P.L.L.C.

(57) ABSTRACT

A system, method and computer program product is provided that automatically selects certain user segments for and excludes certain user segments from receiving online advertisements ("ads") via various publisher Web sites included within an online ad network. By automatically determining which user segments should be targeted for the delivery of online ads on each publisher Web site, an embodiment of the present invention can advantageously increase the performance of the online ad network while reducing the amount of cost, time and potential errors involved in managing the network.

20 Claims, 12 Drawing Sheets

OTHER PUBLICATIONS

Mulcahy, Seana "Online Segmentation: From User to Usage", *The ClickZ Network*; http://www.clickz.com/showPage.html?page=871161, (Aug. 23, 2001), 1 page.

"Segmenting Internet Users: Implications for online advertising", *Digitas LLC; White Paper*; http://digitalhive.blogs.com/digiblog/files/WebDotDigitas.pdf, (Jun. 4, 2007), 6 pages.

* cited by examiner

AUTOMATED USER SEGMENT SELECTION FOR DELIVERY OF ONLINE ADVERTISEMENTS

BACKGROUND OF THE INVENTION

1. Field of the Invention

The present invention generally relates to the delivery of advertisements ("ads") to users over a network, such as by serving ads to Web sites viewed by users browsing the World Wide Web. In particular, the present invention is related to automatically determining whether a particular segment of users should be targeted for ad delivery via a particular Web site.

2. Background

Certain online advertisement ("ad") networks enable online ads to be served to users visiting the Web sites of publishers that are participating in the online ad network. To improve the performance of such online ad networks, it may be deemed desirable to target online ads to certain user groups or "segments." For example, a user segment may be deemed a desirable audience for certain online ads because members of the user segment are deemed likely to click on those ads when viewing them on a publisher Web site or to perform some desired action, termed a "conversion," responsive to viewing the ads on a publisher Web site. However, there are certain difficulties inherent in trying to administer an online ad network that enables selective targeting of user segments across various publisher Web sites.

BRIEF SUMMARY OF THE INVENTION

A system, method and computer program product is described herein for automatically selecting certain user segments for and excluding certain user segments from receiving online advertisements ("ads") via various publisher Web sites included within an online ad network. By automatically determining which user segments should be targeted for the delivery of online ads on each publisher Web site, an embodiment of the present invention can advantageously increase the performance of the online ad network while reducing the amount of cost, time and potential errors involved in managing the network.

In particular, a method for determining whether a user of a network should be targeted for the delivery of advertisements over the network is described herein. In accordance with the method, it is automatically determined whether each of a plurality of user segments should be targeted for the delivery of advertisements via each of a plurality of Web sites accessible over the network. The results of the determination are stored. The stored results are then accessed to determine whether a user that belongs to at least one of the plurality of user segments and that has accessed one of the plurality of Web sites should be targeted for the delivery of advertisements via the accessed Web site.

A computer program product is also described herein. The computer program product includes a computer-readable medium having computer program logic recorded thereon for enabling a processing unit to determine whether a user of a network should be targeted for the delivery of advertisements over the network. The computer program logic includes first means, second means and third means. The first means are for enabling the processing unit to determine whether each of a plurality of user segments should be targeted for the delivery of advertisements via each of a plurality of Web sites accessible over the network. The second means are for enabling the processing unit to store the results of the determination. The third means are for enabling the processing unit to access the stored results to determine whether a user that belongs to at least one of the plurality of user segments and that has accessed one of the plurality of Web sites should be targeted for the delivery of advertisements via the accessed Web site.

A system is also described herein. The system includes user segment selection logic, a database and targeted user identification logic. The user segment selection logic is configured to automatically determine whether each of a plurality of user segments should be targeted for the delivery of advertisements via each of a plurality of Web sites accessible over a network. The database is configured to store the results of the determination. The targeted user identification logic is configured to access the stored results in the database to determine whether a user that belongs to at least one of the plurality of user segments and that has accessed one of the plurality of Web sites should be targeted for the delivery of advertisements via the accessed Web site.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
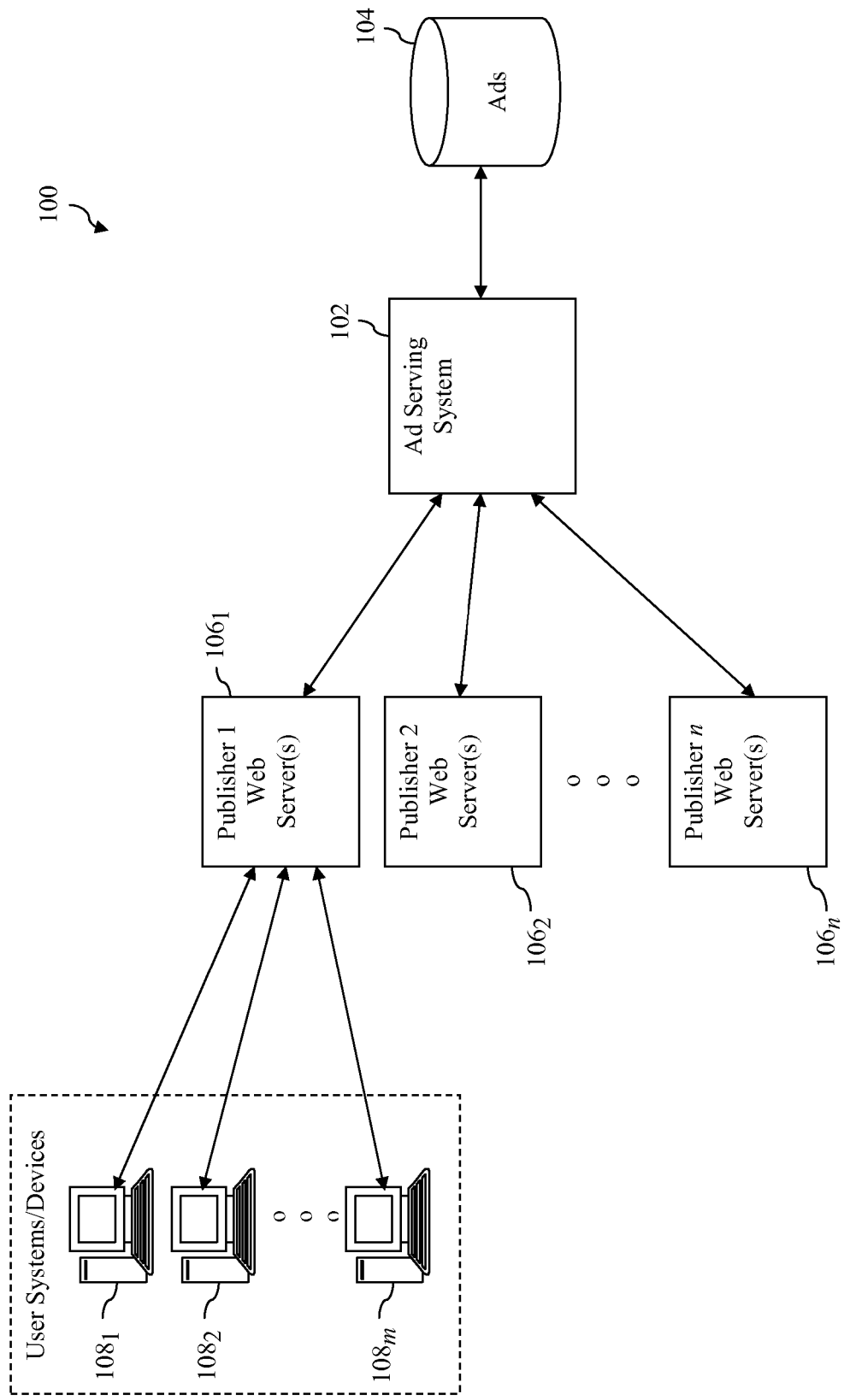
FIG. 1 is a block diagram of an example online advertisement ("ad") network in which an embodiment of the present invention may operate.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

A. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the art to implement such feature, structure, or characteristic in connection with other embodiments whether or not explicitly described.

B. Example Operating Environment

FIG. 1 is a block diagram of an example online advertisement ("ad") network 100 in which an embodiment of the present invention may operate. Generally speaking, online ad network 100 operates to serve online ads provided by advertisers to Web sites published by publishers when such Web sites are accessed by certain users of the network, thereby delivering the online ads to the users. As shown in FIG. 1, online ad network 100 includes an ad serving system 102, an ads database 104, a plurality of publisher Web servers $106_1$-$106_n$, and a plurality of user systems/devices $108_1$-$108_m$.

Each of publisher Web servers $106_1$-$106_n$ is configured to host a Web site published by corresponding publisher 1-$n$ so that such Web site is accessible to users of network 100. A user may access such Web sites using a Web browser or other Web client installed on a system/device owned by or otherwise accessible to the user. By way of example, FIG. 1 depicts a plurality of user systems/devices $108_1$-$108_m$, each of which executes a Web browser that enables a user to visit any of the Web sites hosted by publisher Web servers $106_1$-$106_n$. As depicted in FIG. 1, each of client systems/devices $108_1$-$108_m$ is communicatively connected to publisher 1 Web server(s) $106_1$ for the purpose of accessing a Web site published by publisher 1; however, it is to be understood that each of user systems/devices $108_1$-$108_m$ can also be used to connect to any of publisher Web servers $106_1$-$106_n$ to access the Web sites hosted thereon.

Although user systems/devices $108_1$-$108_m$ are depicted as desktop computers in FIG. 1, persons skilled in the relevant art(s) will appreciate that user systems/devices $108_1$-$108_m$ may include any browser-enabled system or device, including but not limited to laptop computers, personal digital assistants, cellular telephones, or the like. In one implementation, communication between user systems/devices $108_1$-$108_m$ and publisher Web servers $106_1$-$106_n$ is carried out over a wide area network, such as the Internet, using well-known network communication protocols.

As further shown in FIG. 1, ad serving system 102 is communicatively connected to each of publisher Web servers $106_1$-$106_n$. Communication between ad serving system 102 and publisher Web servers $106_1$-$106_n$ may also be carried out over a wide area network such as the Internet. In one implementation, ad serving system 102 is configured to deliver online ads to each of publisher Web servers $106_1$-$106_n$ when the Web sites hosted by such Web servers are accessed by certain users, thereby facilitating the delivery of such online ads to the users. In such an implementation, each of publisher Web servers $106_1$-$106_n$ is configured to serve the ads along with Web site content to the users.

In an alternative implementation, each publisher Web server $106_1$-$106_n$ is configured to embed a request to ad serving system 102 along with the Web site content served to certain users. In response to the execution of the embedded request by the Web browser running on the user system/device, ad serving system 102 will deliver an online ad to the user within the context of the Web site content. In this alternate implementation, a direct connection is established between the user system/device and ad serving system 102 (not shown in FIG. 1). This direct connection may also be established over a wide area network such as the Internet.

The online ads to be delivered to the users may be provided by one or more advertisers and stored in an ads database 104. Ads database 104 may be stored in a memory system or device that is accessible to ad serving system 102. Although only a single ads database 104 is shown in FIG. 1, persons skilled in the relevant art(s) will appreciate that the online ads may be stored in multiple ads databases. Each online ad provided by an advertiser may be associated with a particular ad campaign sponsored by the advertiser.

C. Targeted Delivery of Online Ads to User Segments

Ad serving system 100 is advantageously configured to selectively deliver, or "target," online ads associated with various ad campaigns to certain groups of users, termed "user segments," that are deemed desirable audiences for the ads.

For example, a user segment may be deemed a desirable audience for an online ad because members of the user segment are deemed likely to click on the online ad or to perform some desired action, termed a "conversion," responsive to viewing the online ad. What constitutes a successful conversion will vary depending on the advertiser. For example, if the advertiser is an online retailer, then a successful conversion may constitute the sale of a product to a user whose interest in the product was initially sparked by the online advertisement. As a further example, if the advertiser is an online content creator, a successful conversion may refer to a membership registration, newsletter subscription, software download, or other activity performed by a user and that is somehow attributable to the viewing of the online ad.

By selectively targeting the delivery of online ads to certain desirable user segments, online ad network 100 may advantageously improve the performance of online ad campaigns carried out via the network, thereby increasing a return on investment for each advertiser that has sponsored such a campaign. As a result, each advertiser may be willing to pay more to conduct an ad campaign via online ad network 100 and/or be incented to continue to conduct ad campaigns via online ad network 100. Typical payment arrangements with an advertiser include cost per click (CPC) arrangements in which an advertiser pays a fixed amount to a proprietor of ad serving system 102 each time a user clicks on an online ad delivered via online ad network 100 and cost per action (CPA) or cost per conversion (CPC) arrangements in which an advertiser pays a fixed amount to a proprietor of ad serving system 102 each time a user performs a desired action deemed attributable to the viewing of an online ad delivered via online ad network 100.

Increased revenue from each advertiser may in turn be passed on by a proprietor of ad serving system 102 to each of the publishers hosting Web sites upon which ads are to be delivered. Typical payment arrangements with a publisher include revenue share arrangements in which a publisher receives a fixed percentage of amounts paid by advertisers to a proprietor of ad serving system 102 that are attributable to advertisements served to the publisher's Web site. Another payment arrangement with a publisher may includes a cost per impression (CPI) arrangement in which a proprietor of ad serving system 102 pays a publisher a fixed amount each time an online ad is delivered to a user via the publisher's Web site. Where the fixed price is paid per 1000 impressions, the arrangement is termed a cost per mille (CPM) arrangement.

Figure 2:
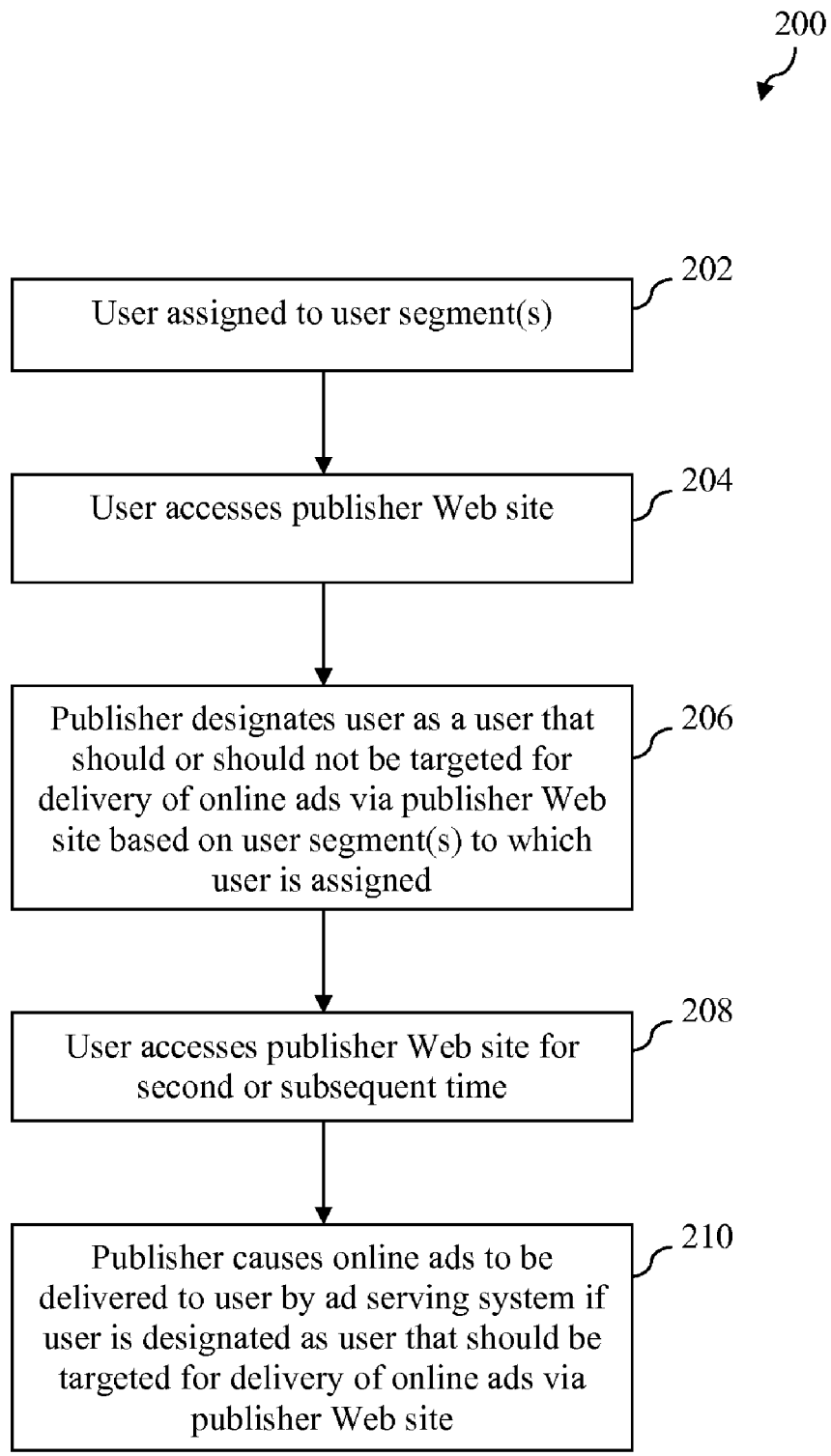
FIG. 2 depicts a flowchart of an example process by which a user may be targeted for the delivery of online ads by an online ad network based on one or more user segments to which the user belongs

FIG. 2 depicts a flowchart 200 of an example process by which a user may be targeted for the delivery of online ads by online ad network 100 based on the user segment(s) to which the user belongs. As shown in FIG. 2, the process of flowchart 200 begins at step 202 in which a user is assigned to one or more user segments. In one implementation, a user is automatically assigned to a user segment in response to performing a certain action or actions. For example, one such action may include visiting a particular Web site, such as visiting a Web site of an advertiser that is sponsoring an ad campaign associated with online ad network 100 or some third-party Web site. Such an action may be recorded by delivering a Web beacon to a user system/device owned by or otherwise accessible to the user. Another such action may include receiving an advertisement on a particular Web site or associated with a particular ad campaign. Still other actions that may result in a user being assigned to a user segment may include, but are not limited to, viewing an ad delivered to the user by ad serving system 102 or located on a Web site, clicking on such an ad, or performing an act of conversion attributable to viewing such an ad. Any combination of the foregoing actions may also be used to determine if a user should be assigned to a user segment. Generally speaking, the actions that result in a user being assigned to a user segment preferably comprise actions that suggest that the user is a good target for the delivery of online ads associated with a particular ad campaign, a particular advertiser, or for online ads generally.

Although various methods may be used to determine when a user should be assigned to a user segment, in each case, the assignment of the user to the user segment is effected by storing data, such as data within a Web cookie, on a user system/device owned by or otherwise accessible to the user. The Web cookie may include, for example, a unique identifier of each user segment to which the user has been assigned and a date and/or time that the user was assigned to each user segment. The use of Web cookies to store data on a user system/device is well known in the art. In an alternate embodiment, the assignment of the user to the user segment is effected by storing data associated with the user in a database within ad serving system 102.

One method by which a user may be assigned to a user segment will now be described with reference to flowchart 300 of FIG. 3. The steps of flowchart 300 will be described with reference to elements of an example user segment assignment system 400, which is shown in block diagram form in FIG. 4. This method is described herein by way of example only and it is noted that various other methods may be used to assign a user to a user segment.

Figure 3:
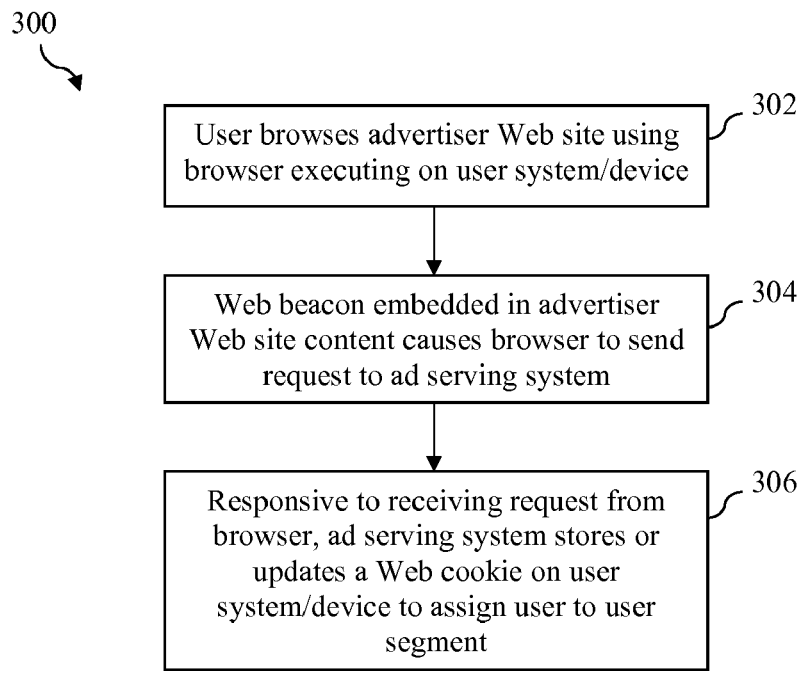
FIG. 3 depicts a flowchart of a method by which a user may be assigned to a user segment.
Figure 4:
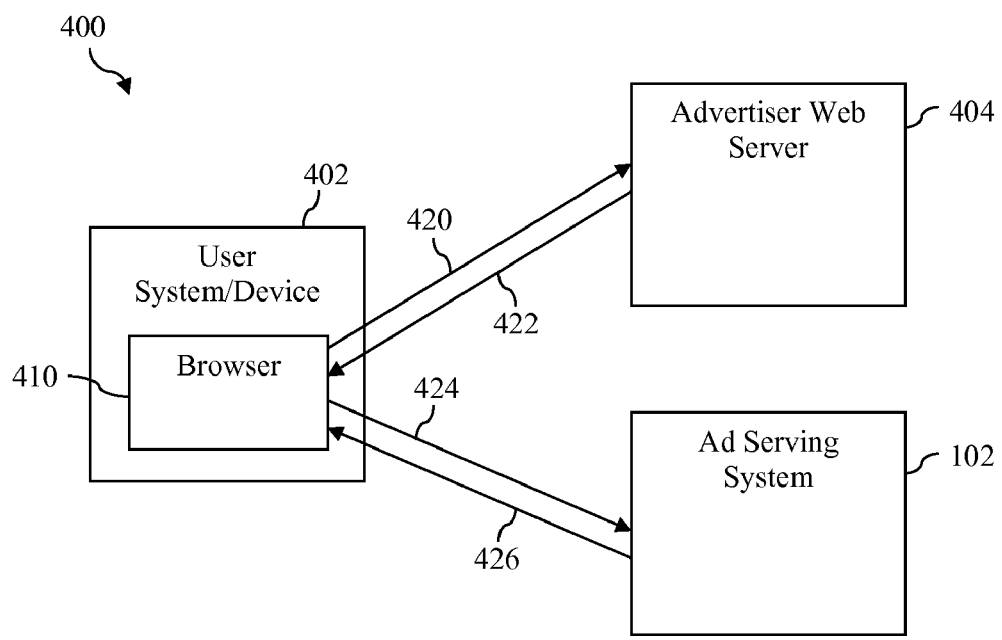
FIG. 4 is a block diagram of an example user segment assignment system.

As shown in FIG. 3, the method of flowchart 300 begins at step 302 in which a user browses an advertiser Web site using a browser 410 executing on a user system/device 402. To browse the advertiser Web site, browser 410 sends a request 420 for Web site content to an advertiser Web server 404 and, responsive to receiving request 420, advertiser Web server 404 sends a response 422 to browser 410 that includes the requested Web site content. Embedded in the Web site content that is returned to browser 410 is a Web beacon.

At step 304, the Web beacon embedded in the Web site content returned to browser 410 causes browser 410 to send a request 424 to ad serving system 102. Request 424 includes information that uniquely identifies user system/device 402. In one implementation, request 424 comprises a request for a transparent 1×1 pixel, although this is merely an example. The sending of request 424 indicates to ad serving system 102 that the user of user system/device 402 has visited the advertiser Web site. The use of Web beacons to determine that a user has accessed a Web site in this manner is well known in the art.

At step 306, responsive to receiving request 424 from browser 410, ad serving system 102 stores a Web cookie on user system/device 402 indicating that the user has been assigned to a particular segment. Alternatively, if a Web cookie associated with ad serving system 102 already exists on user system/device 402, then ad serving system 102 updates the existing Web cookie to indicate that the user has been assigned to the particular segment. The transmission of information from ad serving system 102 to user system/device 402 to create or update a Web cookie stored thereon is generally denoted by the arrow labeled with reference numeral 426 in FIG. 4. As noted above, the data stored on user system/device 402 that indicates that the user has been assigned to a user segment may include, for example, a unique identifier of the user segment to which the user has been assigned and a date and/or time that the user was assigned to the user segment. The Web cookie stored/updated by ad serving system 102 may be encrypted such that it is readable only by ad serving system 102.

Note that although step 306 describes the assignment of the user to a single segment based on browsing an advertiser Web site, it is possible that a user may be assigned to multiple user segments based on browsing an advertiser Web site or performing some other notable activity.

Returning now to the process of flowchart 200, after a user has been assigned to one or more user segments at step 202, the user then accesses a Web site hosted by a publisher Web server operating within online ad network 100 as shown at step 204. This publisher Web server may be, for example, any of publisher Web servers $106_1$-$106_n$ described above in reference to FIG. 1. Responsive to the user accessing the publisher Web site, the publisher designates the user as a user that should or should not be targeted for delivery of online ads via the publisher Web site based on the user segment(s) to which the user belongs as shown at step 206.

One method by which the publisher may perform this designation will now be described with reference to flowchart 500 of FIG. 5. The steps of flowchart 500 will be described with reference to elements of an example system 600, which is shown in block diagram form in FIG. 6. This method is described herein by way of example only and it is noted that various other methods may be used to designate whether or not a user should or should not be targeted for the delivery of online ads via the publisher Web site based on the user segment(s) to which the user belongs.

Figure 5:
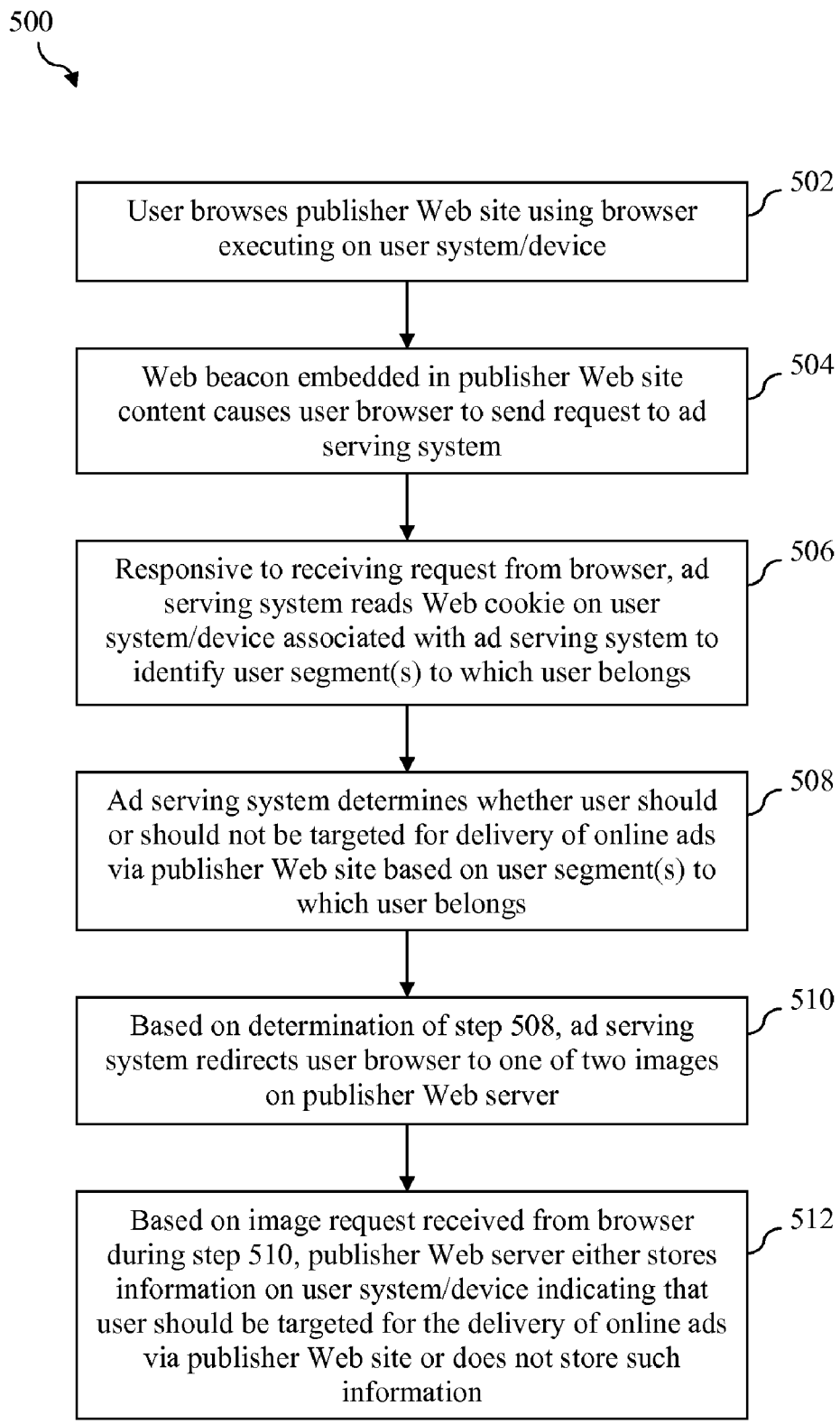
FIG. 5 depicts a flowchart of a method by which a publisher Web server designates whether or not a user or should not be targeted for the delivery of online ads via a publisher Web site based on the user segment(s) to which the user belongs.

As shown in FIG. 5, the method of flowchart 500 begins at step 502, in which a user browses a publisher Web site using browser 410 executing on user system/device 402. To browse the publisher Web site, browser 410 sends a request 602 for Web site content to publisher Web server 106 (which may represent any one of publisher Web servers $106_1$-$106_n$ described above in reference to FIG. 1) and, responsive to receiving request 602, publisher Web server 106 sends a response 604 that includes the desired Web site content to browser 410. Embedded in the Web site content that is returned to browser 410 is a Web beacon.

At step 504, the Web beacon embedded in the Web site content returned to browser 410 causes browser 410 to send a request 606 to ad serving system 102. Request 606 includes information that uniquely identifies user system/device 402. In one implementation, request 606 comprises a request for a transparent 1×1 pixel, although this is merely an example. Request 606 serves as a notification to ad serving system 102 that the user of user system/device 402 has visited the publisher Web site. The use of Web beacons to determine that a user has accessed a Web site in this manner is well known in the art.

At step 506, responsive to receiving request 606 from browser 410, ad serving system 102 reads a Web cookie stored on user system/device 402 associated with ad serving system 102 to identify one or more user segments to which the user belongs. The Web cookie may include, for example, a unique identifier respectively associated with each user segment to which the user belongs and a date and/or time that the user was assigned to each user segment. A manner by which such a Web cookie may be stored on user system/device 402 was previously described in reference to flowchart 300 of FIG. 3 and system 400 of FIG. 4. The reading of the Web cookie by ad serving system 102 is generally indicated by the arrow labeled with reference numeral 608 in FIG. 6.

At step 508, ad serving system 102 determines whether the user should be targeted for delivery of online ads via the publisher Web site based on the user segment(s) to which the user belongs. To make the determination, targeted user identification logic 620 within ad serving system 102 accesses a user segment selection database 622. User segment selection database 622 is a database that stores information that indicates whether or not each user segment within a collection of user segments established by online ad network 100 should be targeted for the delivery of advertisements via each of the participating publisher Web sites in online ad network 100. As will be discussed in more detail below, there may be various reasons why certain user segments should be targeted for the delivery of online ads on one publisher Web site but not targeted for the delivery of such online ads on another publisher Web site.

Targeted user identification logic 620 accesses user segment selection database 622 to determine if any user segment to which the user belongs should be targeted for the delivery of online ads via the publisher Web site being browsed by the user. If at least one user segment to which the user belongs is identified as being a user segment that should be targeted for the delivery of online ads via the publisher Web site being browsed by the user, then targeted user identification logic 620 identifies the user as being a user that should be targeted for the delivery of online ads via the publisher Web site being browsed by the user. Otherwise, targeted identification logic 620 identifies the user as being a user that should not be targeted for the delivery of online ads via the publisher Web site that is being browsed by the user.

Figure 6:
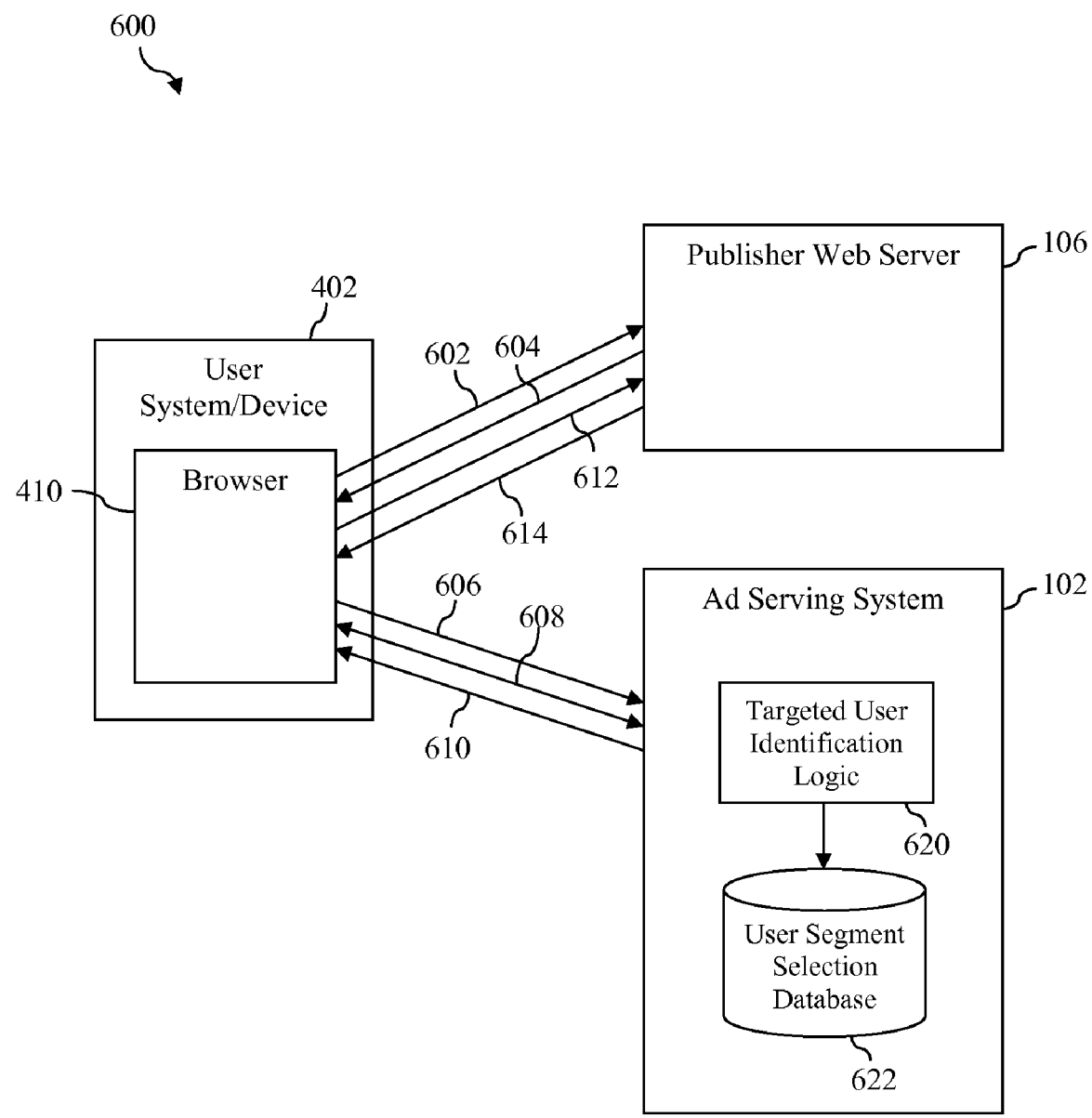
FIG. 6 is a block diagram of a system for enabling a publisher Web server to designate whether or not a user or should not be targeted for the delivery of online ads via a publisher Web site based on the user segment(s) to which the user belongs.

At step 510, based on the determination made in step 508, targeted user identification logic 620 within ad serving system 102 sends information to browser 410 that redirects browser 410 to a selected one of two different images stored on publisher Web server 106. In particular, if targeted user identification logic 620 has identified the user as a user that should be targeted for the delivery of online ads via the publisher Web site that is being browsed by the user, then targeted user identification logic 620 sends information to browser 410 that redirects browser 410 to a first image stored on publisher Web server 106. However, if targeted user identification logic 620 has identified the user as a user that should not be targeted for the delivery of online ads via the publisher Web site that is being browsed by the user, then targeted user identification logic 620 sends information to browser 410 that redirects browser 410 to a second image stored on publisher Web server 106. In FIG. 6, the sending of such information from ad serving system 102 to browser 410 is generally indicated by the arrow labeled with reference numeral 610 while the redirection of browser 410 to a selected one of the two different images stored on publisher Web server 106 is generally indicated by the arrow labeled with reference number 612. In an embodiment, browser 410 is redirected to a URL that eventually results in the appropriate image being served.

At step 512, based on the image request received from browser 410 during step 510, publisher Web server 106 either stores information on user system/device 402 indicating that the user should be targeted for the delivery of online ads via the publisher Web site or does not store such information. In particular, if the image request is for the first image stored on publisher Web server 106, then publisher Web server 106 stores information on user system/device 402 indicating that the user should be targeted for the delivery of online ads via the publisher Web site. However, if the image request is for the second image stored on publisher Web server 106, then publisher Web server may store information on user system/device 402 indicating that the user should not be targeted for the delivery of online ads via the publisher Web site. Any information stored on user system/device 402 during this step may be stored, for example, in a Web cookie associated with the publisher Web site that is readable only by publisher Web server 106. The storage of such information is generally indicated by the arrow labeled with reference numeral 614 in FIG. 6.

Returning now to the process of flowchart 200, after the publisher has designated the user as a user that should or should not be targeted for delivery of online ads via the publisher Web site during step 206, the user accesses the publisher Web site for a second or subsequent time as shown at step 208. Responsive to the user accessing the publisher Web site for a second or subsequent time, the publisher causes online ads to be delivered to the user by ad serving system 102 if the user has been designated as a user that should be targeted for delivery of online ads via the publisher Web site as shown at step 210.

One method by which the publisher may perform the function described in step 210 will now be described with reference to flowchart 700 of FIG. 7. The steps of flowchart 700 will be described with reference to elements of an example system 800, which is shown in block diagram form in FIG. 8. This method is described herein by way of example only and it is noted that various other methods may be used to perform the function.

Figure 7:
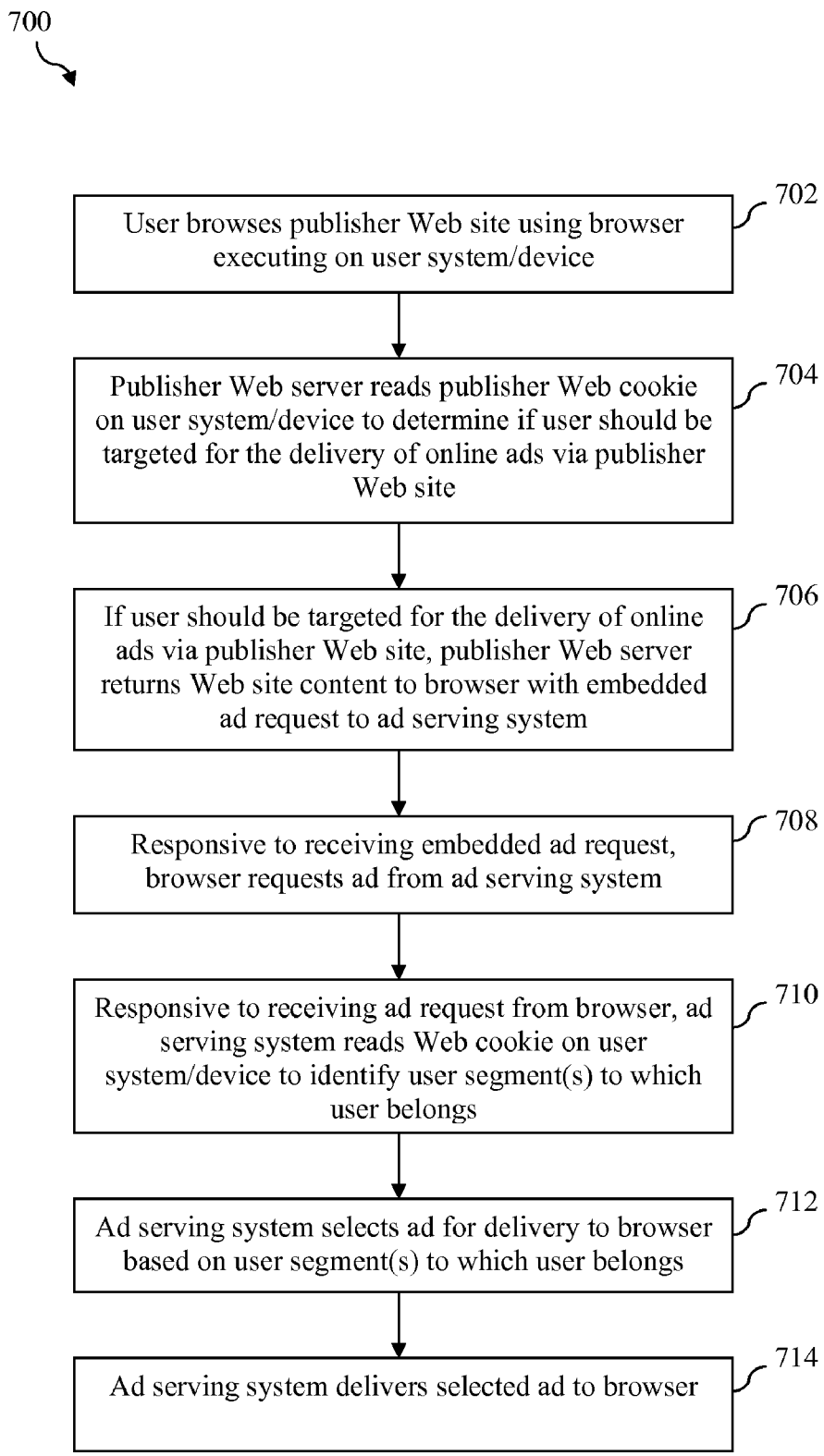
FIG. 7 depicts a flowchart of a method by which a publisher of a Web site may cause online ads to be delivered to a user that is browsing the Web site by an ad serving system.
Figure 8:
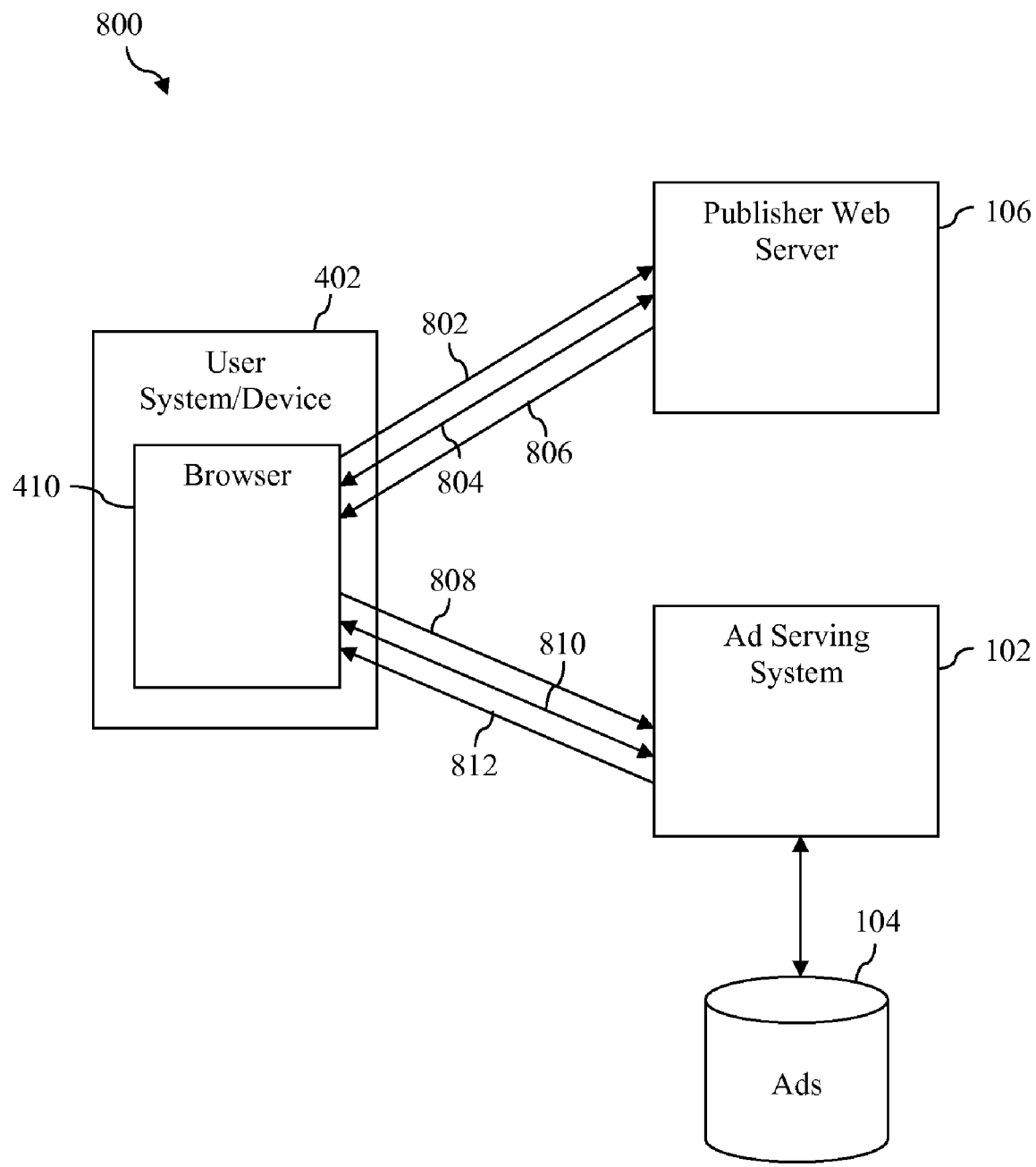
FIG. 8 is a block diagram of a system for enabling a publisher of a Web site to cause online ads to be delivered to a user that is browsing the Web site by an ad serving system.

As shown in FIG. 7, the method of flowchart 700 begins at step 702, in which a user once again browses the publisher Web site using browser 410 executing on user system/device 402. To browse the publisher Web site, browser 410 sends a request 802 for Web site content to publisher Web server 106. At step 704, responsive to receiving request 802, publisher Web server 106 reads a publisher Web cookie that is stored on user system/device 102 and that indicates if the user should be targeted for the delivery of online ads via the publisher Web site. A manner by which such a Web cookie may be stored on user system/device 402 was previously described in reference to flowchart 500 of FIG. 5 and system 600 of FIG. 6. The reading of the publisher Web cookie by ad serving system 102 is generally indicated by the arrow labeled with reference numeral 804 in FIG. 8.

At step 706, if the publisher Web cookie indicates that user should be targeted for the delivery of online ads via the publisher Web site, then publisher Web server 106 sends a response 806 to browser 410 that includes the Web site content requested during step 702 and an embedded ad request to ad serving system 102.

At step 708, responsive to receiving the embedded ad request, browser 410 sends an ad request 808 to ad serving system 102. At step 710, responsive to receiving ad request 808, ad serving system 102 reads a Web cookie associated with ad serving system 102 stored on user system/device 102 that identifies one or more user segments to which the user belongs. A manner by which such a Web cookie may be stored on user system/device 402 was previously described in reference to flowchart 300 of FIG. 3 and system 400 of FIG. 4. The reading of this Web cookie by ad serving system 102 is generally indicated by the arrow labeled with reference numeral 810 in FIG. 8.

At step 710, ad serving system 102 selects an ad for delivery to browser 410 based on the user segment(s) to which the user belongs. The ad may be selected from an ads database 104, which was described above in reference to FIG. 1. This selection process may involve, for example, selecting an ad that belong to ad campaign that is associated with a user segment to which the user belongs. At step 712, ad serving system 102 delivers the selected ad to browser 410 for display within the context of the Web site content returned during step 706. The delivery of the selected ad to browser 410 is generally indicated by the arrow labeled with reference numeral 812 in FIG. 8.

D. Automated User Segment Selection

As noted above, ad serving system 102 within ad network 100 includes a user segment selection database 622 that stores information that indicates whether or not each user segment within a collection of user segments established by online ad network 100 should be targeted for the delivery of advertisements via each of the participating publisher Web sites in online ad network 100.

Figure 9:
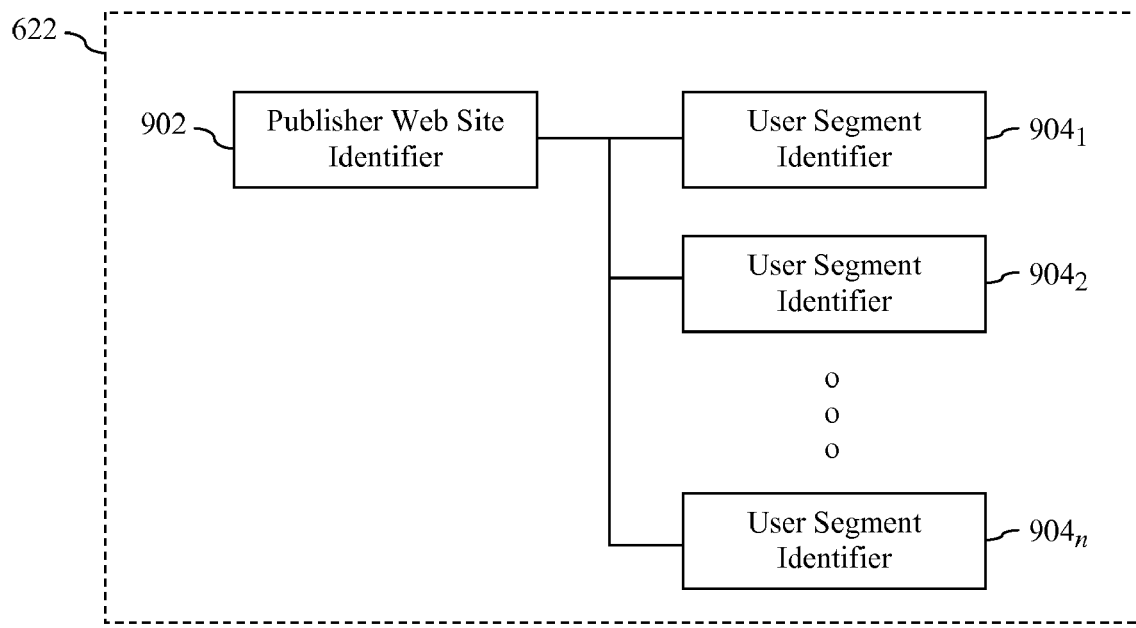
FIG. 9 depicts a logical structure that may be used to implement a user segment selection database.

In one implementation, user segment selection database 622 includes an identifier of each participating publisher Web site and, in association with each such identified Web site, identifiers of the user segments that should be targeted for receiving online advertisements via the identified Web site. An example of such an implementation is depicted in FIG. 9. As shown in FIG. 9, user segment selection database 622 may include a publisher Web site identifier 902 and, in association with publisher Web site identifier 902, a series of user segment identifiers $904_1$-$904_n$ that identify user segments that should be targeted for receiving online advertisements via the publisher Web site identified by publisher Web site identifier 902. It is to be understood that user segment selection database 622 may include numerous such publisher Web site identifiers and associated user segment identifiers. It is also to be understood that some publisher Web site identifiers may have only one or no associated user segment identifiers.

The logical structure depicted in FIG. 9 is provided by way of example only. In another example implementation, user segment selection database 622 includes an identifier of each user segment and, in association with each such identified user segment, identifiers of the publisher Web sites that should be selected for delivering online advertisements to the identified user segment. Still other logical structures may be used.

In one implementation, user segment selection database 622 may be modified by a system administrator to assign certain segments to certain publisher Web sites or to exclude certain segments from certain publisher Web sites. By modifying database 622 in such a manner, ad serving system 102 may advantageously be configured to selectively target certain user segments for the delivery of online ads via a publisher Web site while selectively excluding other user segments from receiving online ads via the same Web site.

There are various reasons why it may be deemed desirable to target certain user segments for receiving online ads via a publisher Web site while excluding other user segments. For example, the performance of certain user segments, as measured by user click-through rates or conversion rates, can vary significantly across publisher Web sites. If a user segment is performing well on a particular publisher Web site, then it may be deemed advantageous to continue to target that user segment for receiving online ads via that Web site. Conversely, if a user segment is not performing well on a particular publisher Web site, then it may be deemed advantageous to exclude the user segment from receiving online ads via that Web site. It may also be deemed advantageous to exclude a user segment from receiving online ads via a publisher Web site in a situation in which the cost of placing the ad on the Web site exceeds the expected revenue from placing the ad.

Various other reasons may exist for excluding a user segment from receiving online ads on a particular publisher Web site. For example, the user segment may be associated with an ad campaign that is incompatible in some way with the publisher Web site. The incompatibility may be due to the fact that the subject matter of the ad campaign somehow conflicts with the subject matter of the publisher Web site or due to the fact that the sponsor of the ad campaign is a competitor of the publisher. The incompatibility may also be due to the fact that the ads associated with the ad campaign cannot be accommodated by the publisher Web site for some technical reason (e.g., the allocated space for the ad on the publisher Web site does not match the size of the ads associated with the ad campaign).

Figure 10:
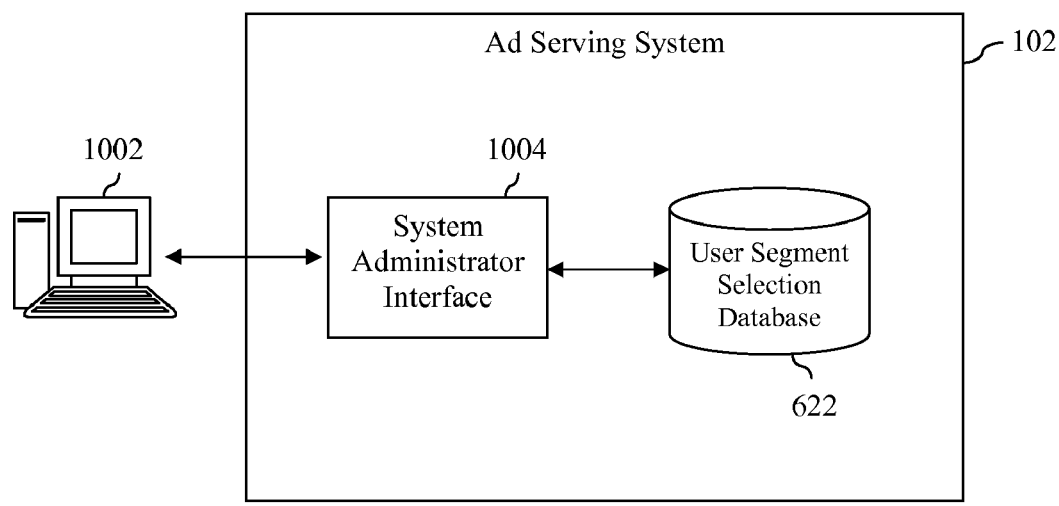
FIG. 10 is a block diagram of an ad serving system that includes a system administrator interface that allows a system administrator working at a workstation to directly interact with data entities stored in a user segment selection database.

FIG. 10 is a block diagram of an implementation of ad serving system 102 that includes a system administrator interface 1004 that allows a system administrator, working at a workstation 1002, to directly interact with user segment selection database 622 for the purpose of assigning certain segments to certain publisher Web sites or excluding certain segments from certain publisher Web sites. Such an implementation requires the system administrator to manually associate user segments with and/or disassociate user segments from publisher Web sites. This approach to maintaining the information in user segment selection database 622 can become unwieldy if there are a large number of user segments and/or publisher Web sites. For example, if there are a large number of user segments and/or publisher Web sites, this approach can consume a significant amount of system administration time, which is expensive and which also limits the frequency with which database 622 can be updated. This approach is also prone to human error, since the system administrator must manually configure the data in database 622.

Figure 11:
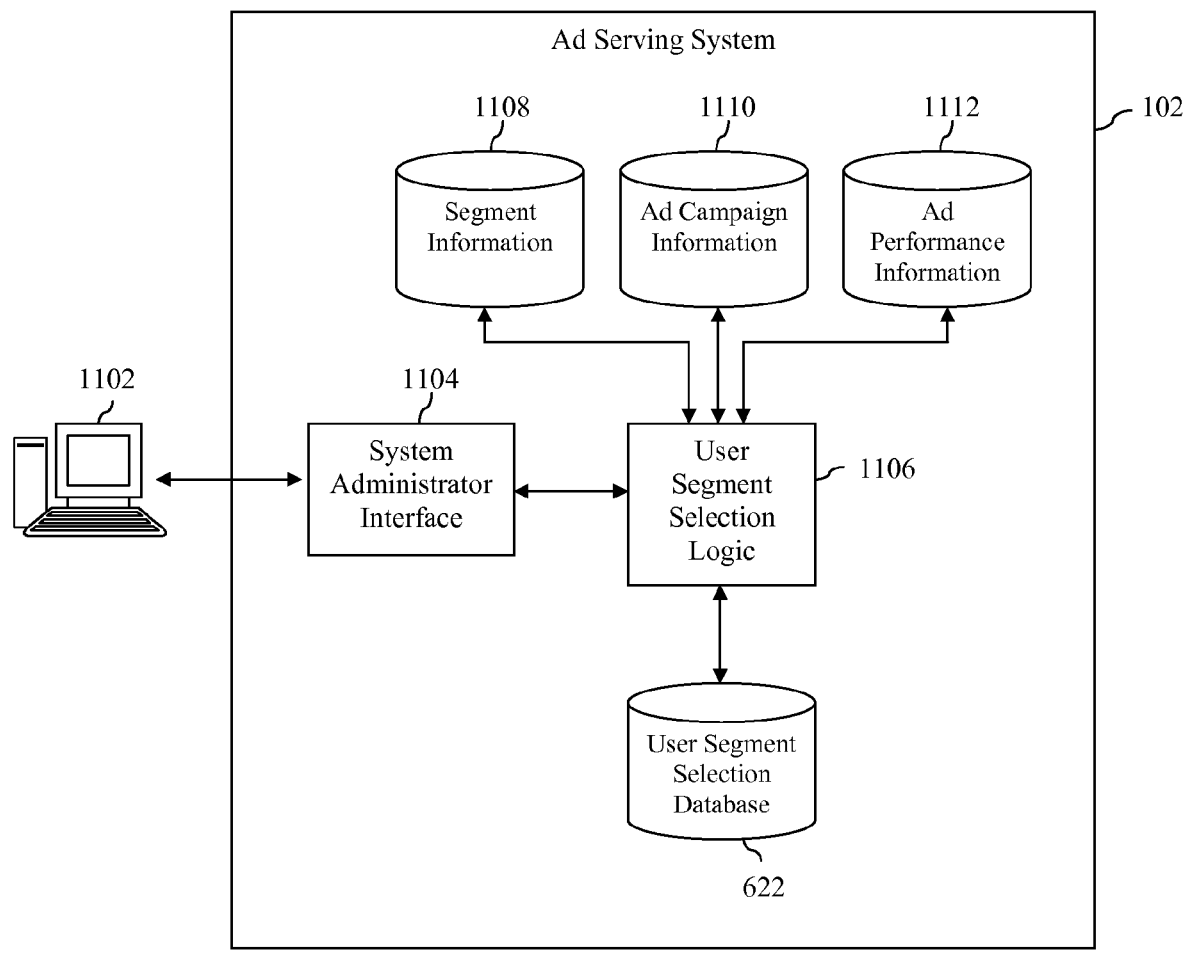
FIG. 11 is a block diagram of an implementation of an ad serving system in accordance with an embodiment of the present invention in which user segments are automatically selected for or excluded from receiving online ads on publisher Web sites.

FIG. 11 is a block diagram of an implementation of ad serving system 102 in accordance with an embodiment of the present invention that includes user segment selection logic 1106 configured to automatically select user segments for and exclude user segments from receiving online ads on publisher Web sites. Because the implementation of ad serving system 102 shown in FIG. 11 performs these functions automatically, it is an improvement over the implementation depicted in FIG. 10. For example, by performing such functions automatically, the implementation of ad serving system 102 shown in FIG. 11 can easily maintain the information stored in user segment selection database 622 even if there are a large number of user segments and/or publisher Web sites. This approach also allows the user segment selection/exclusion process to be performed very quickly, which means the process can also be performed more frequently. Furthermore, this approach allows the user segment selection/exclusion process to be performed with little or no human intervention, thereby freeing up resources and avoiding human error.

In addition to user segment selection logic 1106 and user segment selection database 622, the implementation of ad serving system 102 shown in FIG. 11 includes various information databases that may be used by user segment selection logic 1106 in performing the user segment selection/exclusion process. These databases include a user segment information database 1108, an ad campaign information database 1110 and an ad performance information database 1112. The types of information maintained by and retrieved from these databases by user segment selection logic 1106 for performing the user segment selection/exclusion process will be described below.

As further shown in FIG. 11, ad serving system 102 includes a system administrator interface 1104 that allows a system administrator or other authorized user, working at a workstation 1102, to configure certain aspects of the manner in which user segment selection logic 1106 operates.

Figure 12:
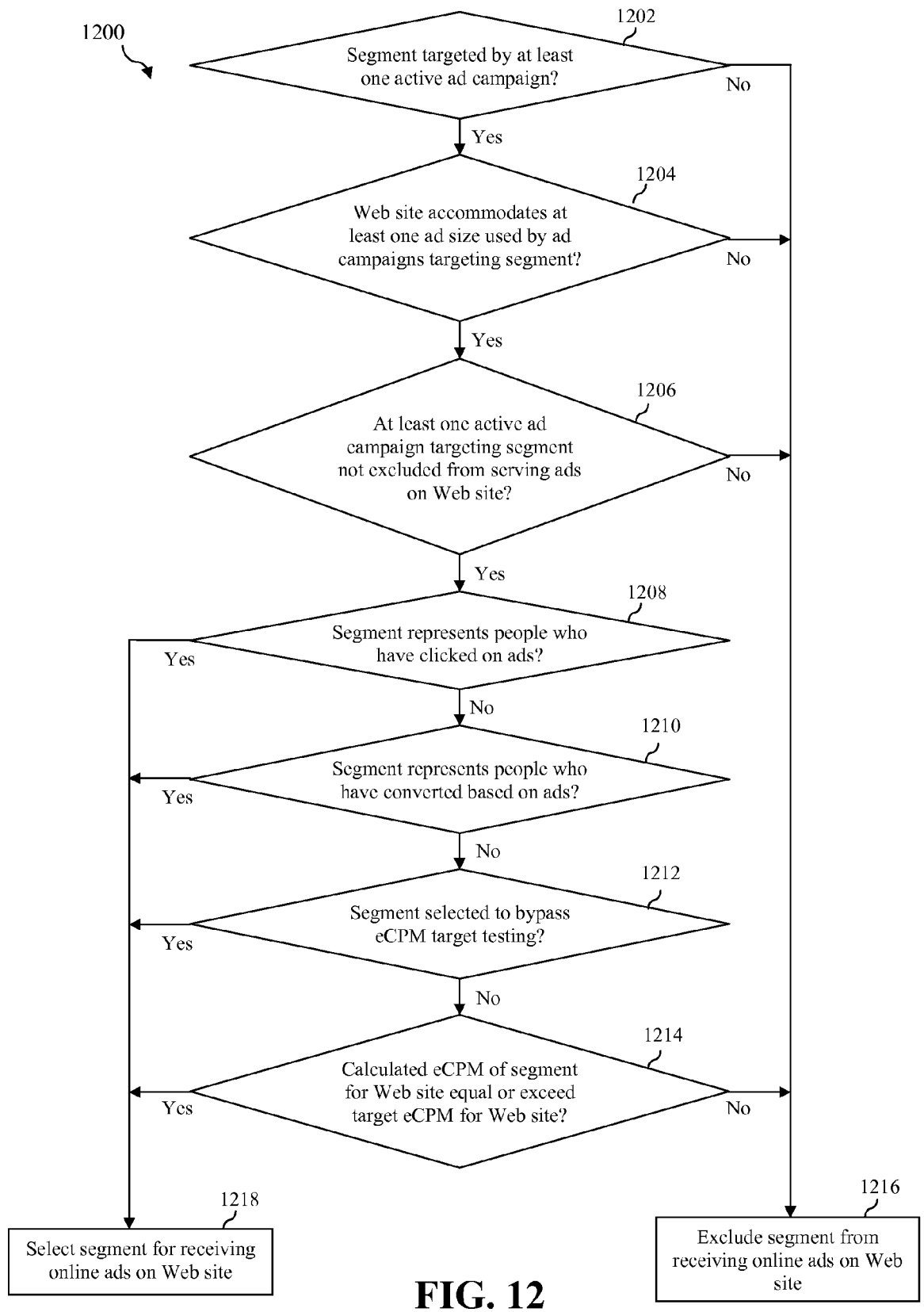
FIG. 12 depicts a flowchart of a method for automatically selecting user segments for and excluding user segments from receiving online ads on publisher Web sites in accordance with an embodiment of the present invention.

FIG. 12 depicts a flowchart 1200 of a process by which user segment selection logic 1106 automatically selects user segments for and excludes user segments from receiving online ads on publisher Web sites in accordance with an embodiment of the present invention. As will be made apparent from the following description, each decision step within flowchart 1200 may be thought of as a test or "business rule" that is used to determine whether a particular segment should be selected for or excluded from receiving online ads via a particular publisher Web site. These business rules are described herein by way of example only. Persons skilled in the relevant art(s) will readily appreciate that additional or alternative business rules may be used to perform the automated user segment selection/exclusion process.

The method of flowchart 1200 will now be described. In one implementation, the method of flowchart 1200 is performed for each unique combination of publisher Web site and user segment in online ad network 100. Thus, for each iteration of the method of flowchart 1200, a single publisher Web site within the plurality of publisher Web sites within the network and a single user segment within the plurality of user segments within the network is considered.

As shown in FIG. 12, the method of flowchart 1200 begins at decision step 1202, in which user segment selection logic 1106 determines whether the user segment is targeted by at least one active ad campaign. User segment selection logic 1106 may make this determination by accessing data from either user segment information database 1108 or ad campaign information database 1110, depending upon the implementation. If the user segment is not targeted by at least one active ad campaign, then user segment selection logic 1106 excludes the user segment from receiving online ads via the publisher Web site as shown at step 1216. Otherwise, processing proceeds to decision step 1204.

At decision step 1204, user segment selection logic 1106 determines if the publisher Web site can accommodate at least one ad size used by any active ad campaign that is currently targeting the user segment. In one implementation, user segment selection logic 1106 makes this determination by accessing data from ad campaign information database 1110. If the publisher Web site cannot accommodate at least one ad size used by an active ad campaign that is currently targeting the user segment, then user segment selection logic 1106 excludes the user segment from receiving online ads via the publisher Web site as shown at step 1216. Otherwise, processing proceeds to decision step 1206.

At decision step 1206, user segment selection logic 1106 determines if at least one active ad campaign that is currently targeting the user segment is not excluded from delivering ads to the particular Web site. As discussed above, ads associated with an ad campaign may be excluded from a publisher Web site if the ad campaign is deemed to be incompatible in some way with the publisher Web site. In one implementation, user segment selection logic 1106 makes this determination by accessing data from ad campaign information database 1110. If every active ad campaign that is currently targeting the user segment is excluded from delivering ads to the publisher Web site, then user segment selection logic 1106 excludes the user segment from receiving online ads via the publisher Web site as shown at step 1216. Otherwise, processing proceeds to decision step 1208.

At decision step 1208, user segment selection logic 1106 determines if the user segment represents users that have previously clicked on ads delivered by ad serving system 102. In one implementation, user segment selection logic 1106 makes this determination by accessing data from user segment information database 1108. User segments representing users that have previously clicked on ads delivered by ad serving system 102 may be deemed particularly desirable targets for the future delivery of online ads. Thus, an embodiment of the present invention selects such user segments for receiving online ads on the publisher Web site regardless of how such user segments have historically responded to online ads delivered on the publisher Web site. In particular, if the user segment represents users that have clicked on ads delivered by ad serving system 102, then user segment selection logic 1106 selects the user segment for receiving online ads via the publisher Web site as shown at step 1218. This effectively bypasses a user segment selection test based on user segment performance on the publisher Web site which will be described in more detail below in reference to decision step 1214. If, however, the user segment does not represent users that have clicked on ads delivered by ad serving system 102, then processing proceeds to decision step 1210.

At decision step 1210, user segment selection logic 1106 determines if the user segment represents users that have previously performed an act of conversion attributable to viewing an ad delivered by ad serving system 102. In one implementation, user segment selection logic 1106 makes this determination by accessing data from user segment information database 1108. Like user segments that have previously clicked on ads delivered by ad serving system 102, user segments representing users that have previously performed acts of conversion attributable to viewing an ad delivered by ad serving system 102 may be deemed particularly desirable targets for the future delivery of online ads. Thus, an embodiment of the present invention selects such user segments for receiving online ads on the publisher Web site regardless of how such user segments have historically responded to online ads delivered on the publisher Web site. In particular, if the user segment represents users that have performed an act of conversion attributable to viewing an ad delivered by ad serving system 102, then user segment selection logic 1106 selects the user segment for receiving online ads via the publisher Web site as shown at step 1218. This effectively bypasses a user segment selection test based on user segment performance on the publisher Web site which will be described in more detail below in reference to decision step 1214. If, however, the user segment does not represent users that have performed an act of conversion attributable to viewing an ad delivered by ad serving system 102, then processing proceeds to decision step 1212.

Depending upon the implementation, other user segments deemed desirable targets for the future delivery of online ads can also be selected to receive online ads via the publisher Web site, thereby bypassing the test of decision step 1214. Such user segments may include, for example, users that have received a particular advertisement or that have visited a particular Web site. However, these examples are not intended to be limiting and other criteria may be used.

At decision step 1212, user segment selection logic 1106 determines if the user segment has been selected for receiving online ads on all publisher Web sites regardless of how such user segment historically has responded to online ads delivered on the publisher Web sites. In one implementation, user segment selection logic 1106 makes this determination by accessing data from user segment information database 1108. If the user segment has been selected for receiving online ads on all publisher Web sites regardless of how such user segment historically has responded to online ads delivered on the publisher Web sites, then user segment selection logic 1106 selects the user segment for receiving online ads via the publisher Web site as shown at step 1218. This effectively bypasses a user segment selection test based on user segment performance on the publisher Web site which will be described in more detail below in reference to decision step 1214. Thus, this step allows for overriding of the user segment selection test for selected user segments. If, however, the user segment has not been selected for receiving online ads on all publisher Web sites regardless of how such user segment historically has responded to online ads delivered on the publisher Web sites, then processing proceeds to decision step 1214.

At decision step 1214, user segment selection logic 1106 determines if a calculated effective cost per mille (eCPM) of the user segment for the publisher Web site equals or exceeds a target eCPM for the publisher Web site. The calculated eCPM is essentially a measurement of the effectiveness of previously-delivered ads to the user segment via the publisher Web site. The calculated eCPM is measured in terms of the amount of payment that accrues to the publisher for every 1000 ad impressions delivered by the publisher. The target eCPM is a predetermined goal for the publisher Web site. Where the calculated eCPM for the publisher Web site and user segment equals or exceeds the target eCPM for the publisher Web site, the user segment is deemed to be performing at an acceptable level on the publisher Web site. Where the calculated eCPM for the publisher Web site and user segment does not equal or exceed the target eCPM for the publisher Web site, the user segment is deemed to be performing at an unacceptable level on the publisher Web site.

The eCPM of a user segment for a publisher Web site may be calculated in a number of ways. In one embodiment of the present invention, the eCPM is calculated based on historical data relating to how users within the user segment have responded to online ads delivered to the publisher Web site. Such data may include, for example, click-through rates or conversion rates associated with users within the user segment that have received online ads delivered to the publisher Web site. User segment selection logic 1106 may retrieve such historical data from ad performance information database 1112.

In one embodiment, the eCPM of a user segment for a publisher Web site may be calculated by dividing the amount of revenue that accrues to the publisher over a particular time period due to the delivery of ads to the user segment via the publisher Web site by the number of ad impressions delivered to the user segment via the publisher Web site over the particular time period and then by multiplying the result by 1000. Thus for example, assume that advertisers are paying a cost per click of $0.40, the publisher is being paid a 50% revenue share, and the user segment receives 3,500 ad impressions via the publisher Web site over a particular time period and delivers 35 clicks to the advertisers over the particular time period. In this case, the advertisers are paying $0.40/click*35 clicks, which equals $14.00. The publisher receives a 50% share of this revenue, or $7.00. Thus, the eCPM of the user segment for the publisher Web site for the particular time period may be calculated as $7.00/3,500*1000, which equals a $2.00 eCPM. Of course, this is only an example, and numerous other methods may be used to calculate an eCPM of a user segment for a publisher Web site.

If the calculated eCPM of the user segment for the publisher Web site does not equal or exceed the target eCPM for the publisher Web site, then user segment selection logic 1106 excludes the user segment from receiving online ads on the publisher Web site as shown at step 1216. However, if the calculated eCPM of the user segment for the publisher Web site does equal or exceed the target eCPM for the publisher Web site, then user segment selection logic 1106 selects the user segment for receiving online ads on the publisher Web site as shown at step 1218. This step thereby ensures that user segments that are not performing acceptably on a publisher Web site will not be selected to receiving ads on the publisher Web site. Note that, depending upon the implementation, a predicted eCPM of a user segment for the publisher Web site may be used to perform this step rather than an actual eCPM based on historical data.

In one embodiment of the present invention, user segment selection logic 1106 is configured to perform the process of flowchart 1200 on a periodic basis to ensure that the data being used to implement the various business rules is up-to-date. For example, in one implementation, user segment selection logic 1106 is configured to perform the process of flowchart 1200 once per day, although this is only an example.

In a further implementation, a system administrator or other authorized user may configure certain operating parameters that affect the manner in which the process of flowchart 1200 is executed by user segment selection logic 1106. For example, a system administrator or other authorized user working at workstation 1102 may interact with system administrator interface 1104 to configure such operating parameters. In one embodiment, the system administrator or authorized user can set the frequency with which the process of flowchart 1200 is performed. In another embodiment, the system administrator or authorized user can selectively turn on or off each of the different business rules represented in flowchart 1200. In still another embodiment, the system administrator or authorized user can specify the amount of historical data that is to be used to perform the eCPM calculation of decision step 1214. For example, the system administrator or authorized user may specify that from 1 to 7 days worth of historical data may be used. In a further implementation, if no historical data relating to a particular user segment is available for a particular publisher Web site, an eCPM of the user segment for the entire online ad network will be used to implement decision step 1214 until a specified time period of 1 to 7 days has passed.

Once user segment selection logic 1106 has performed the process of flowchart 1200 for every user segment and publisher Web site combination, the results of the process are stored in user segment selection database 622 described above in reference to FIG. 6. The data in database 622 is then used by targeted user identification logic 620 in the manner described above in reference to step 508 of flowchart 500.

Figure 13:
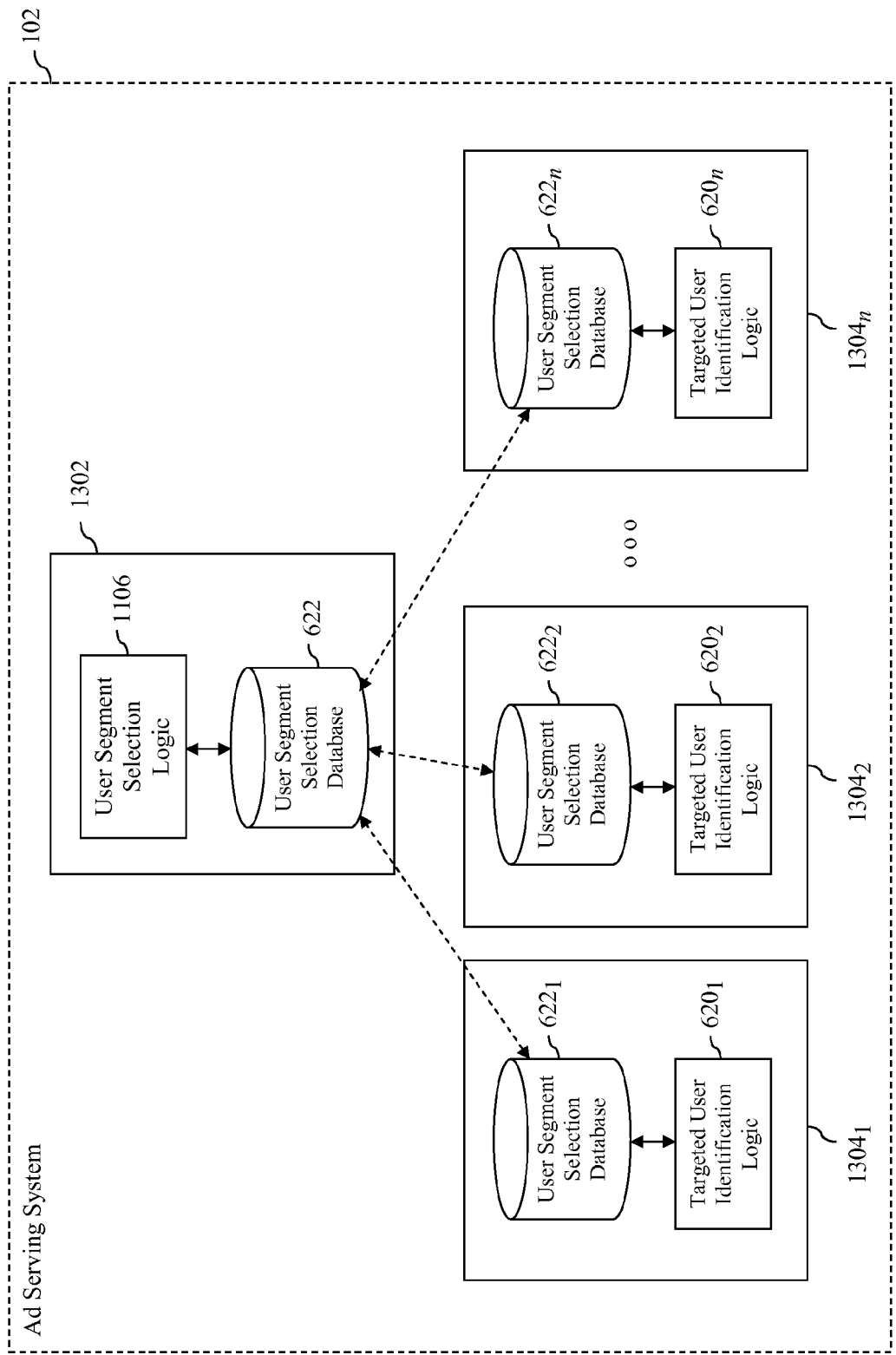
FIG. 13 is a block diagram of an ad serving system in accordance with an embodiment of the present invention in which multiple updated copies of a user segment selection database are automatically generated and distributed to separate ad serving computer systems.

FIG. 13 is a block diagram 1300 of an embodiment of the present invention in which user segment selection logic 1106 executes on a first computer system 1302 within ad serving system 1102 to generate an updated version of user segment selection database 622. Multiple copies of updated user segment selection database 622, denoted user segment selection databases $622_1$-$622_n$, are then distributed to separate ad serving computer systems $1304_1$-$1304_n$. Within each ad serving computer system $1304_1$-$1304_n$, a corresponding instance of targeted user identification logic $620_1$-$620_n$ uses the data in a corresponding user segment selection database $622_1$-$622_n$ in the manner described above in reference to step 508 of flowchart 500. This enables for parallel execution of the process of flowchart 500 by the multiple ad serving computer systems $1304_1$-$1304_n$ within ad serving system 1102. The example implementation of FIG. 13 is provided by way of example only. Persons skilled in the relevant art(s) will readily appreciate that other implementations may be used as well.

E. Example Computer System Implementation

Each of the elements of the various systems depicted in FIGS. 1, 4, 6, 8, 10, 11 and 13 and each of the steps of flowcharts depicted in FIGS. 2, 3, 5, 7 and 12 may each be implemented by one or more processor-based computer systems. An example of such a computer system 1400 is depicted in FIG. 14.

Figure 14:
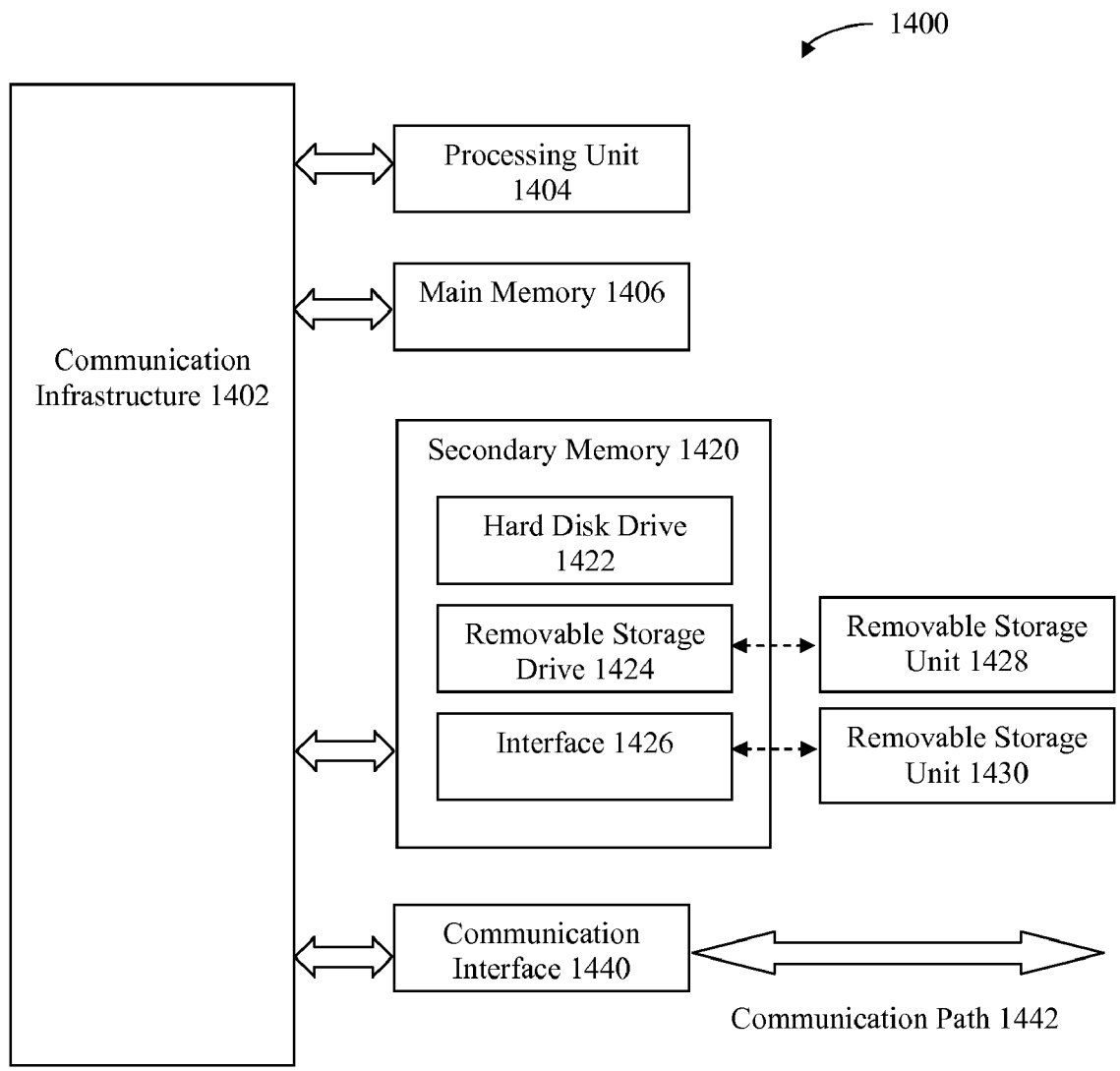
FIG. 14 is a block diagram of a computer system that may be used to implement one or more aspects of the present invention.

As shown in FIG. 14, computer system 1400 includes a processing unit 1404 that includes one or more processors. Processor unit 1404 is connected to a communication infrastructure 1402, which may comprise, for example, a bus or a network.

Computer system 1400 also includes a main memory 1406, preferably random access memory (RAM), and may also include a secondary memory 1420. Secondary memory 1420 may include, for example, a hard disk drive 1422, a removable storage drive 1424, and/or a memory stick. Removable storage drive 1424 may comprise a floppy disk drive, a magnetic tape drive, an optical disk drive, a flash memory, or the like. Removable storage drive 1424 reads from and/or writes to a removable storage unit 1428 in a well-known manner. Removable storage unit 1428 may comprise a floppy disk, magnetic tape, optical disk, or the like, which is read by and written to by removable storage drive 1424. As will be appreciated by persons skilled in the relevant art(s), removable storage unit 1428 includes a computer usable storage medium having stored therein computer software and/or data.

In alternative implementations, secondary memory 1420 may include other similar means for allowing computer programs or other instructions to be loaded into computer system 1400. Such means may include, for example, a removable storage unit 1430 and an interface 1426. Examples of such means may include a program cartridge and cartridge interface (such as that found in video game devices), a removable memory chip (such as an EPROM, or PROM) and associated socket, and other removable storage units 1430 and interfaces 1426 which allow software and data to be transferred from the removable storage unit 1430 to computer system 1400.

Computer system 1400 may also include a communication interface 1440. Communication interface 1440 allows software and data to be transferred between computer system 1400 and external devices. Examples of communication interface 1440 may include a modem, a network interface (such as an Ethernet card), a communications port, a PCMCIA slot and card, or the like. Software and data transferred via communication interface 1440 are in the form of signals which may be electronic, electromagnetic, optical, or other signals capable of being received by communication interface 1440. These signals are provided to communication interface 1440 via a communication path 1442. Communications path 1442 carries signals and may be implemented using wire or cable, fiber optics, a phone line, a cellular phone link, an RF link and other communications channels.

As used herein, the terms "computer program medium" and "computer readable medium" are used to generally refer to media such as removable storage unit 1428, removable storage unit 1430 and a hard disk installed in hard disk drive 1422. Computer program medium and computer readable medium can also refer to memories, such as main memory 1406 and secondary memory 1420, which can be semiconductor devices (e.g., DRAMs, etc.). These computer program products are means for providing software to computer system 1400.

Computer programs (also called computer control logic, programming logic, or logic) are stored in main memory 1406 and/or secondary memory 1420. Computer programs may also be received via communication interface 1440. Such computer programs, when executed, enable the computer system 1400 to implement features of the present invention as discussed herein. Accordingly, such computer programs represent controllers of the computer system 1400. Where the invention is implemented using software, the software may be stored in a computer program product and loaded into computer system 1400 using removable storage drive 1424, interface 1426, or communication interface 1440.

The invention is also directed to computer program products comprising software stored on any computer readable medium. Such software, when executed in one or more data processing devices, causes a data processing device(s) to operate as described herein. Embodiments of the present invention employ any computer readable medium, known now or in the future. Examples of computer readable mediums include, but are not limited to, primary storage devices (e.g., any type of random access memory) and secondary storage devices (e.g., hard drives, floppy disks, CD ROMS, zip disks, tapes, magnetic storage devices, optical storage devices, MEMs, nanotechnology-based storage device, etc.).

F. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method for determining whether a user of a network should be targeted for the delivery of advertisements over the network, comprising:
   providing a user interface that enables an authorized user to select one or more tests from a plurality of tests, wherein each test can be used to determine whether a particular user segment in a plurality of user segments should be targeted for the delivery of advertisements via a particular Web site in a plurality of Web sites accessible over a network, wherein the plurality of tests analyze data received from a first database, a second database, and a third database, the first database storing user segment behavioral data, the second database storing attributes associated with each of the advertisements, the third database storing performance data associated with each of the advertisements;
   automatically determining by a first computer whether each of the plurality of user segments should be targeted for the delivery of advertisements via each of the plurality of Web sites, wherein the automatically determining comprises automatically applying only those tests selected by the authorized user via the user interface to each unique user segment and Web site combination;
   storing the results of the determination in one or more data structures, wherein each data structure includes an identification of a Web site in the plurality of Web sites and one or more user segments that should be targeted for the delivery of advertisements via the identified Web site;
   accessing the data structure(s) by a second computer to determine whether a user that belongs to at least one of the plurality of user segments and that has accessed one of the plurality of Web sites should be targeted for the delivery of advertisements via the accessed Web site; and
   automatically determining by the first computer whether one or more user segments that were previously determined to be targeted for the delivery of advertisements via one or more Web sites should be excluded for the delivery of advertisements via the one or more Web sites by applying those tests selected by the authorized user via the user interface to each unique user segment and Web site combination.

2. The method of claim 1, wherein automatically applying the tests selected by the authorized user via the user interface to each unique user segment and Web site combination comprises:
   determining that a particular user segment within the plurality of user segments should be targeted for the delivery of advertisements via a particular Web site within the plurality of Web sites only if the particular user segment is targeted by at least one active advertising campaign.

3. The method of claim 1, wherein automatically applying the tests selected by the authorized user via the user interface to each unique user segment and Web site combination comprises:
   calculating an effective cost per mille (eCPM) associated with a particular user segment within the plurality of user segments for a particular Web site within the plurality of Web sites; and
   determining that the particular user segment should be targeted for the delivery of advertisements via the particular Web site only if it is determined that the calculated eCPM is greater than or equal to a target eCPM for the particular Web site.

4. The method of claim 1, wherein automatically applying the tests selected by the authorized user via the user interface to each unique user segment and Web site combination comprises:
   determining if a particular user segment within the plurality of user segments represents users that have received an advertisement or performed a particular action responsive to receiving an advertisement.

5. The method of claim 1, wherein automatically applying the tests selected by the authorized user via the user interface to each unique user segment and Web site combination comprises:
   determining if a particular user segment within the plurality of user segments represents users that have visited a particular Web site.

6. The method of claim 1, wherein automatically applying the tests selected by the authorized user via the user interface to each unique user segment and Web site combination comprises:
   determining that a particular user segment should be targeted for the delivery of advertisements via a particular Web site within the plurality of Web sites regardless of whether a calculated effective cost per mille (eCPM) associated with the particular user segment for the particular Web site is less than a target eCPM for the particular Web site.

7. The method of claim 1, wherein automatically applying the tests selected by the authorized user via the user interface to each unique user segment and Web site combination comprises:
   determining that a particular user segment within the plurality of user segments should be targeted for the delivery of advertisements via a particular Web site within the plurality of Web sites only if at least one advertising campaign that targets the particular user segment is not excluded from delivering advertisements to the particular Web site.

8. The method of claim 1, wherein the determining and storing steps are performed on a periodic basis.

9. The method of claim 1, wherein accessing the data structure(s) to determine whether a user that belongs to at least one of the plurality of user segments and that has accessed one of the plurality of Web sites should be targeted for the delivery of advertisements via the accessed Web site comprises:

receiving a notification that the user has accessed the one of the plurality of Web sites;

retrieving information that identifies one or more of the plurality of user segments to which the user belongs; and determining whether any user segment to which the user belongs is targeted for the delivery of advertisements via the accessed Web site based on the data structure(s).

10. The method of claim 9, further comprising:

sending a notification to a publisher of the accessed Web site that the user should be targeted for the delivery of advertisements via the accessed Web site responsive to determining that at least one user segment to which the user belongs is targeted for the delivery of advertisements via the accessed Web site.

11. A computer program product comprising a computer-readable storage medium having computer program logic recorded thereon, which, when executed by a processing unit, performs operations to determine whether a user of a network should be targeted for the delivery of advertisements over the network, the operations comprising:

providing a user interface that enables an authorized user to select one or more tests from a plurality of tests, wherein each test can be used to determine whether a particular user segment in a plurality of user segments should be targeted for the delivery of advertisements via a particular Web site in a plurality of Web sites accessible over a network, wherein the plurality of tests analyze data received from a first database, a second database, and a third database, the first database storing user segment behavioral data, the second database storing attributes associated with each of the advertisements, the third database storing performance data associated with each of the advertisements;

determining whether each of the plurality of user segments should be targeted for the delivery of advertisements via each of the plurality of Web sites, wherein said determining comprises applying only those tests selected by the authorized user via the user interface to each unique user segment and Web site combination;

storing the results of the determination in one or more data structures, wherein each data structure includes an identification of a Web site in the plurality of Web sites and one or more user segments that should be targeted for the delivery of advertisements via the identified Web site;

accessing the stored data structure(s) to determine whether a user that belongs to at least one of the plurality of user segments and that has accessed one of the plurality of Web sites should be targeted for the delivery of advertisements via the accessed Web site; and determining whether one or more user segments that were previously determined to be targeted for the delivery of advertisements via one or more Web sites should be excluded for the delivery of advertisements via the one or more Web sites by applying those tests selected by the authorized user via the user interface to each unique user segment and Web site combination.

12. The computer program product of claim 11, wherein applying the tests selected by the authorized user via the user interface to each unique user segment and Web site combination comprises:

determining that a particular user segment within the plurality of user segments should be targeted for the delivery of advertisements via a particular Web site within the plurality of Web sites only if the particular user segment is targeted by at least one active advertising campaign.

13. The computer program product of claim 11, wherein applying the tests selected by the authorized user via the user interface to each unique user segment and Web site combination comprises:

calculating an effective cost per mille (eCPM) associated with a particular user segment within the plurality of user segments for a particular Web site within the plurality of Web sites; and determining that the particular user segment should be targeted for the delivery of advertisements via the particular Web site only if it is determined that the calculated eCPM is greater than or equal to a target eCPM for the particular Web site.

14. The computer program product of claim 11, wherein applying the tests selected by the authorized user via the user interface to each unique user segment and Web site combination comprises:

determining if a particular user segment within the plurality of user segments represents users that have received an advertisement or performed a particular action responsive to receiving an advertisement.

15. The computer program product of claim 11, wherein applying the tests selected by the authorized user via the user interface to each unique user segment and Web site combination comprises:

determining if a particular user segment within the plurality of user segments represents users that have visited a particular Web site.

16. The computer program product of claim 11, wherein applying the tests selected by the authorized user via the user interface to each unique user segment and Web site combination comprises:

determining that a particular user segment should be targeted for the delivery of advertisements via a particular Web site within the plurality of Web sites regardless of whether a calculated effective cost per mille (eCPM) associated with the particular user segment for the particular Web site is less than a target eCPM for the particular Web site.

17. The computer program product of claim 11, wherein applying the tests selected by the authorized user via the user interface to each unique user segment and Web site combination comprises:

determining that a particular user segment within the plurality of user segments should be targeted for the delivery of advertisements via a particular Web site within the plurality of Web sites only if at least one advertising campaign that targets the particular user segment is not excluded from delivering advertisements to the particular Web site.

18. The computer program product of claim 11, wherein accessing the stored data structure(s) to determine whether a user that belongs to at least one of the plurality of user segments and that has accessed one of the plurality of Web sites should be targeted for the delivery of advertisements via the accessed Web site comprises:

receiving a notification that the user has accessed the one of the plurality of Web sites;

retrieving information that identifies one or more of the plurality of user segments to which the user belongs; and determining whether any user segment to which the user belongs is targeted for the delivery of advertisements via the accessed Web site based on the data structure(s).

19. The computer program product of claim 18, wherein the operations further comprise:

sending a notification to a publisher of the accessed Web site that the user should be targeted for the delivery of advertisements via the accessed Web site responsive to a determination that at least one user segment to which the user belongs is targeted for the delivery of advertisements via the accessed Web site.

20. A system, comprising:

a first computer system configured to execute user segment selection logic a first time to determine whether each of a plurality of user segments should be targeted for the delivery of advertisements via each of a plurality of Web sites accessible over a network, wherein the determination includes applying one or more tests selected from among a plurality tests by an authorized user via a user interface of the first computer system to each unique user segment and Web site combination, wherein each test is used to determine whether a particular user segment in the plurality of user segments should be targeted for the delivery of advertisements via a particular Web site in the plurality of Web sites, wherein the plurality of tests analyze data received from a first database, a second database, and a third database, the first database storing user segment behavioral data, the second database storing attributes associated with each of the advertisements, the third database storing performance data associated with each of the advertisements; and a second computer system that is configured to access a fourth database that stores the results of the determination in one or more data structures, each data structure including an identification of a Web site in the plurality of Web sites and one or more user segments that should be targeted for the delivery of advertisements via the identified Web site, to execute targeted user identification logic to access the data structure(s) in the fourth database to determine whether a user that belongs to at least one of the plurality of user segments and that has accessed one of the plurality of Web sites should be targeted for the delivery of advertisements via the accessed Web site, and to execute the user segment selection logic a second time to determine whether one or more user segments that were previously determined to be targeted for the delivery of advertisements via one or more Web sites should be excluded for the delivery of advertisements via the one or more Web sites by applying those tests selected by the authorized user via the user interface to each unique user segment and Web site combination.

* * * * *